United States Patent
Werner

(10) Patent No.: US 7,584,861 B2
(45) Date of Patent: Sep. 8, 2009

(54) EXPANDABLE MODULAR RACK FOR STORING AT LEAST ONE PISTOL OF ANY WIDTH AND/OR AT LEAST ONE SIMILARLY CONFIGURED ITEM IN ITS/THEIR NORMAL UPRIGHT POSITION

(76) Inventor: Theodore J. Werner, 193 W. Hills Rd., Huntington Station, NY (US) 11746

( * ) Notice: Subject to any disclaimer, the term of this patent is extended or adjusted under 35 U.S.C. 154(b) by 542 days.

(21) Appl. No.: 11/407,445

(22) Filed: Apr. 19, 2006

(65) Prior Publication Data

US 2007/0251901 A1    Nov. 1, 2007

(51) Int. Cl.
  *A47F 7/00*   (2006.01)
(52) U.S. Cl. .......................................... 211/64; 211/184
(58) Field of Classification Search .................... 211/10, 211/42, 43, 60.1, 62, 64, 69, 70.7, 126, 184, 211/189; 206/315.1, 315.11, 317; 220/507, 220/676; 248/37.3, 159; 403/109.1, 109.4, 403/118
See application file for complete search history.

(56) References Cited

U.S. PATENT DOCUMENTS

| | | | | |
|---|---|---|---|---|
| 856,316 A * | 6/1907 | Thurston | ..................... | 403/118 |
| 945,877 A * | 1/1910 | Updegraff | ..................... | 211/43 |
| 1,597,565 A * | 8/1926 | Backus | ..................... | 211/62 |
| 2,511,735 A * | 6/1950 | Patterson | ..................... | 211/69.8 |
| 2,620,929 A * | 12/1952 | Sportsman | ..................... | 108/28 |
| 2,740,530 A * | 4/1956 | Ponder | ..................... | 211/64 |
| 2,959,293 A * | 11/1960 | Von Meyer | ..................... | 211/40 |
| 3,031,069 A * | 4/1962 | Hirsch | ..................... | 206/317 |
| 3,329,278 A * | 7/1967 | Pachmayr | ..................... | 211/64 |
| 3,731,818 A * | 5/1973 | Young | ..................... | 206/317 |
| 4,537,315 A * | 8/1985 | Griffin | ..................... | 211/70.6 |
| 4,890,466 A * | 1/1990 | Cislo | ..................... | 70/63 |
| 4,971,208 A * | 11/1990 | Reinfried et al. | ..................... | 211/64 |
| 5,228,578 A * | 7/1993 | Wu | ..................... | 211/43 |
| 5,375,337 A * | 12/1994 | Butler | ..................... | 33/506 |
| 5,503,276 A * | 4/1996 | Pierce | ..................... | 211/64 |
| 5,520,294 A * | 5/1996 | Hanes | ..................... | 213/75 R |
| 5,996,865 A * | 12/1999 | Bissey | ..................... | 224/275 |
| 6,547,070 B1 * | 4/2003 | Kolpin | ..................... | 206/317 |

* cited by examiner

*Primary Examiner*—Jennifer E. Novosad
(74) *Attorney, Agent, or Firm*—Charles E. Baxley

(57) ABSTRACT

An expandable modular rack for storing at least one pistol of any width and/or at least one similarly configured item in its/their normal upright position. The expandable modular rack includes at least one first member, at least one second member, and at least one third member. The at least one first member, the at least one second member, and the at least one third member are interchangeably attached to each other, side-by-side, so as to form at least one bay. Each bay is defined by a vertical portion and a horizontal portion. The vertical portion of each bay supports the barrel of an associated pistol or an associated similarly configured item, the horizontal portion of each bay supports the heel of the grip of the associated pistol or the associated similarly configured item, and each bay is of varying width, thereby allowing each bay to store the associated pistol or the associated similarly configured item of any width in its normal upright position.

9 Claims, 3 Drawing Sheets

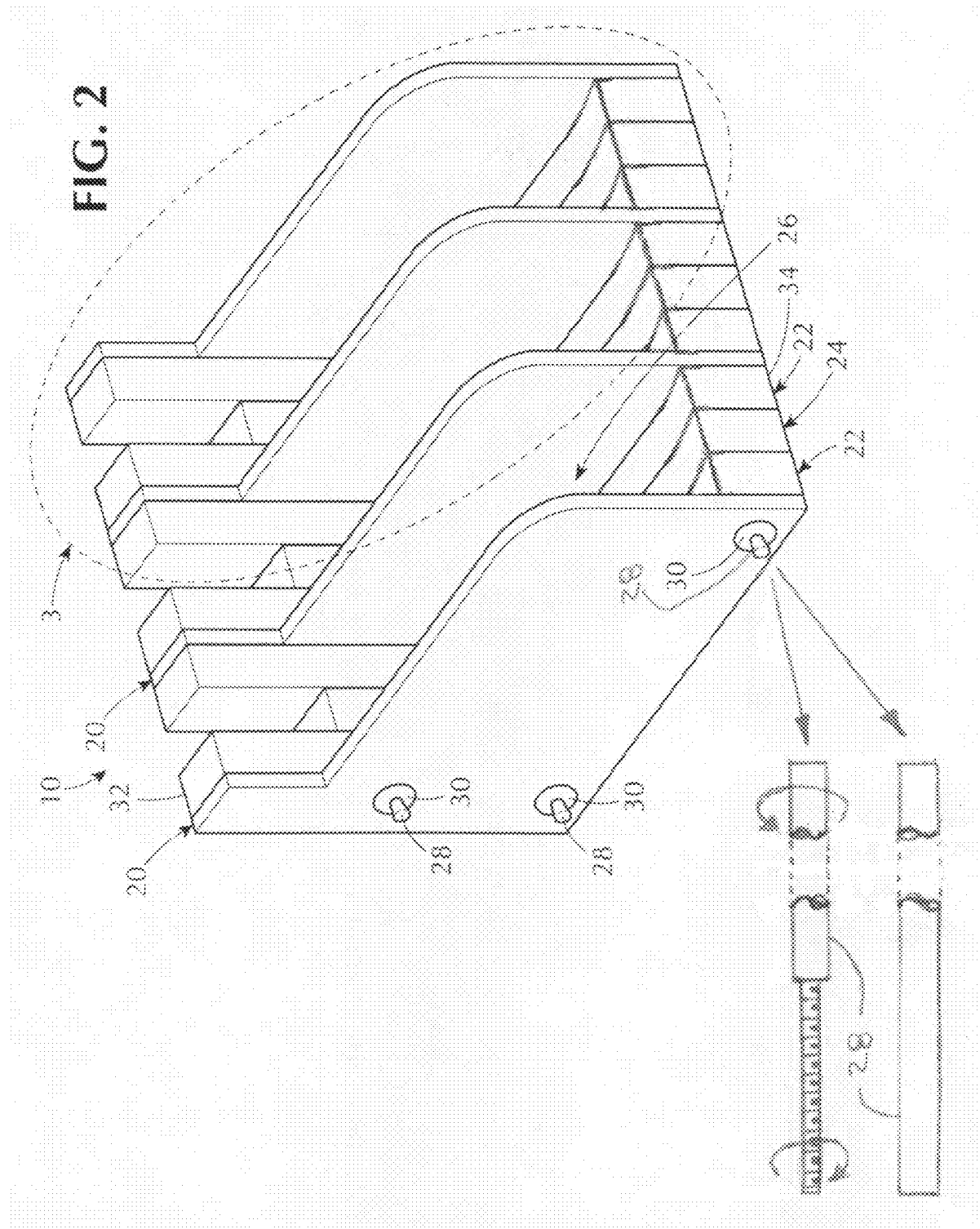

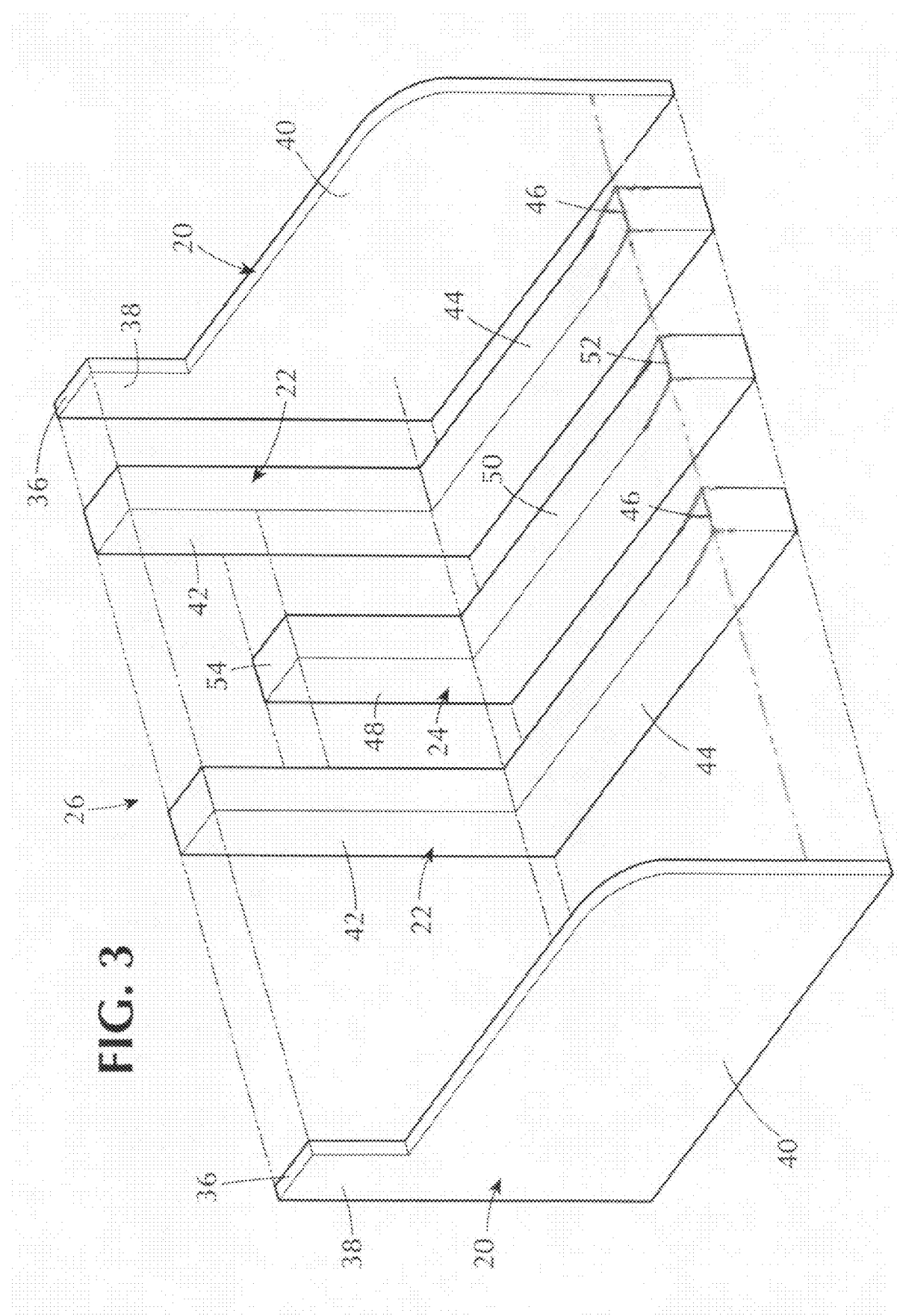

EXPANDABLE MODULAR RACK FOR STORING AT LEAST ONE PISTOL OF ANY WIDTH AND/OR AT LEAST ONE SIMILARLY CONFIGURED ITEM IN ITS/THEIR NORMAL UPRIGHT POSITION

1. BACKGROUND OF THE INVENTION

A. Field of the Invention

The present invention relates to a rack for a pistol, and more particularly, the present invention relates to an expandable modular rack for storing at least one pistol of any width and/or at least one similarly configured item in its/their normal upright position.

B. Description of the Prior Art

Sportsmen who collect or use fire arms, as a general rule, take particularly good care of the weapons they own including the cleaning and storage aspects of responsible ownership. With regard to handguns, most owners keep their small guns locked in a secure location, and often owners will have a commercial safe in their home for the sole purpose of securing their handguns.

Many individuals and organizations maintain and store firearms usually in some form of locking device to provide a certain amount of security for the weapon or weapons. The security requirements are to prevent unauthorized use or theft of the weapon or weapons. In particular, the home is vulnerable to robbery and subsequent theft of any weapons, or the weapon could be used on the homeowner by the robber. Usually, the owner will store firearms in a locking rack that is generally made of wood and offers very little security for the contained weapon. Most gun racks are loosely attached to a wall or similar object, which means that the entire gun rack may be taken for later removal of the contained firearms.

One of the inconveniences of storing handguns is that it is convention to store a handgun by laying it on its side. In some situations, the gun is in the original case it was in when purchased, in other situations the gun is simply laid on a towel or blanket. Unfortunately, space in an affordable safe is generally limited and therefore storing handguns quickly uses the available space, leaving the active owner in a state of consternation.

Numerous innovations for pistol storing devices have been provided in the prior art that will be described below. Even though these innovations may be suitable for the specific individual purposes to which they address, they each differ in structure and/or operation and/or purpose from the present invention in that they do not teach an expandable modular rack for storing at least one pistol of any width and/or at least one similarly configured item in its/their normal upright position.

(1) U.S. Pat. No. 4,890,466 to Cislo.

U.S. Pat. No. 4,890,466 issued to Cislo on Jan. 2, 1990 teaches an apparatus to lock a handgun within a compartment while the compartment is readily lockable to a stationary object using a detachable bracket. The compartment is only accessible by authorized persons selecting a particular code that unlocks a latch to open the compartment. The bracket can only be detached when the apparatus is in an open position. The latch can be lighted to allow the selecting of the proper code in darkness. The apparatus also serves to carry the handgun and can be subsequently used to so secure the handgun at another location.

(2) U.S. Pat. No. 5,503,276 to Pierce.

U.S. Pat. No. 5,503,276 issued to Pierce on Apr. 2, 1996 teaches a stand for storing multiple handguns, including a base and a vertical panel perpendicular to the base. The vertical panel contains a number of slots with a follower behind the panel and studs extending through the panel to engage a threaded cavity in the follower. The stud and follower slide in the slot and are locked in place by a stop ring on the stud. The barrel of a handgun slides over the stud and the heel of the grip may rest on the base.

(3) U.S. Pat. No. 5,520,291 to Graham.

U.S. Pat. No. 5,520,291 issued to Graham on May 28, 1996 teaches a manner of locking firearms within a theft proof gun rack. The apparatus comes in two embodiments for use with long guns or pistols and utilizes a locking bar locking the firearm within a given partition within the gun rack. The long gun embodiment of the apparatus accepts various sized guns, either in or out of soft gun cases, by using an optional spacer to accept smaller guns within the rack. The apparatus is designed to be mounted to a wall or similar object, and once a firearm is in place and locked, the mounting bolts are unreachable. Protection of the finish of the firearm is afforded by a resilient covering on all parts of the rack that come in contact with the firearm.

(4) U.S. Pat. No. 5,996,865 to Bissey.

U.S. Pat. No. 5,996,865 issued to Bissey on Dec. 7, 1999 teaches a container for securing a hand gun and ammunition in the passenger compartment of a vehicle. The container is foam lined and has preformed contour receptacles for accommodating a particular style of hand gun and ammunition associated therewith. The container has a securable lid and a hinged flap along a lower edge for insertion between the passenger seat and the passenger seat back rest. The hinged flap has a securing apparatus for attachment once so inserted. The container further has hook and loop fasteners secured to the underside for alternatively securing the container to the front passenger floor of the passenger compartment.

(5) U.S. Pat. No. 6,547,070 to Kolpin.

U.S. Pat. No. 6,547,070 issued to Kolpin on Apr. 15, 2003 teaches a handgun case for protecting and transporting a pistol or revolver, including a closable outer shell, an inner liner within the outer shell, a variety of accessories removably attachable to the inner liner at any point on the inner liner, for example by hook-and-loop fasteners, a closed-cell foam pad between the outer shell and the inner liner, and a number of resilient protective ribs on the outer shell.

It is apparent that numerous innovations for pistol storing devices have been provided in the prior art that are adapted to be used. Furthermore, even though these innovations may be suitable for the specific individual purposes to which they address, they would not be suitable for the purposes of the present invention as heretofore described, namely, an expandable modular rack for storing at least one pistol of any width and/or at least one similarly configured item in its/their normal upright position.

2. SUMMARY OF THE INVENTION

Thus, an object of the present invention is to provide an expandable modular rack for storing at least one pistol of any width and/or at least one similarly configured item in its/their normal upright position that avoids the disadvantages of the prior art.

Briefly stated, another object of the present invention is to provide an expandable modular rack for storing at least one pistol of any width and/or at least one similarly configured item in its/their normal upright position. The expandable modular rack includes at least one first member, at least one second member, and at least one third member. The at least one first member, the at least one second member, and the at least one third member are interchangeably attached to each other, side-by-side, so as to form at least one bay. Each bay is defined by a vertical portion and a horizontal portion. The vertical portion of each bay supports the barrel of an associated pistol or an associated similarly configured item, the horizontal portion of each bay supports the heel of the grip of the associated pistol or the associated similarly configured item, and each bay is of varying width, thereby allowing each bay to store the associated pistol or the associated similarly configured item of any width in its normal upright position.

The novel features which are considered characteristic of the present invention are set forth in the appended claims. The invention itself, however, both as to its construction and its method of operation together with additional objects and advantages thereof will be best understood from the following description of the specific embodiments when read and understood in connection with the accompanying drawing.

3. BRIEF DESCRIPTION OF THE DRAWING

The figures of the drawing are briefly described as follows:

FIG. 2 is a diagrammatic perspective view of the expandable modular rack of the present invention identified by ARROW 2 in FIG. 1; and FIG. 3 is an exploded diagrammatic perspective view of the area generally enclosed by the dotted curve identified by ARROW 3 in FIG. 2 of a typical bay of the expandable modular rack of the present invention.

4. LIST OF REFERENCE NUMERALS UTILIZED IN THE DRAWING

Figure 1:
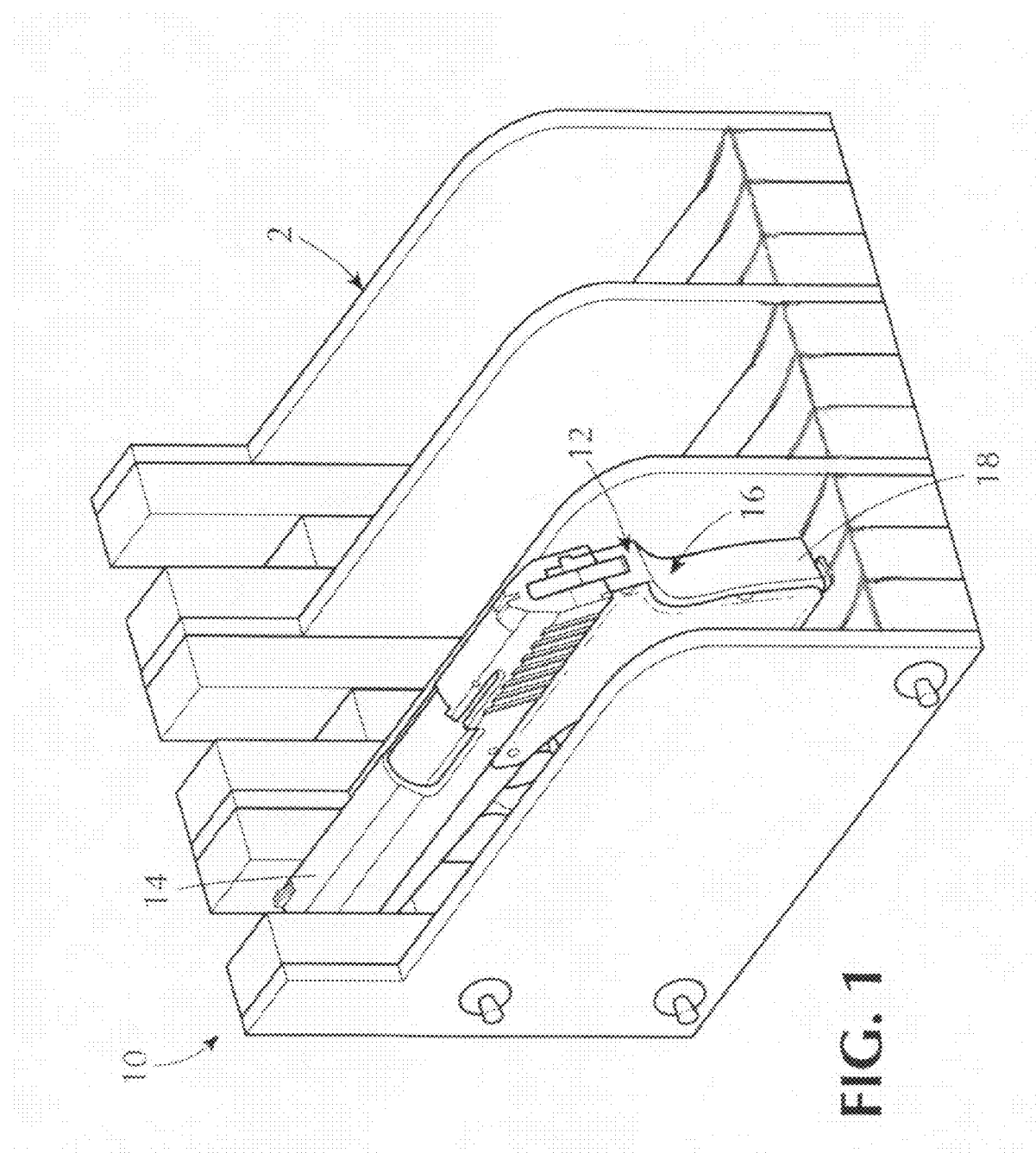
FIG. 1 is a diagrammatic perspective view of the expandable modular rack of the present invention storing at least one pistol of any width and/or at least one similarly configured item in its/their normal upright position.

A. General 10 expandable modular rack of present invention for storing at least one pistol 12 of any width and/or at least one similarly configured item in its/their normal upright position 12 at least one pistol of any width and/or at least one similarly configured item 14 barrel of each pistol of at least one pistol 12 of any width and/or each similarly configured item of at least one similarly configured item 16 grip of each pistol of at least one pistol 12 of any width and/or each similarly configured item of at least one similarly configured item 18 heel of grip 16 of each pistol of at least one pistol 12 of any width and/or each similarly configured item of at least one similarly configured item

B. Overall Configuration 20 at least one pair of first members
22 at least one pair of second members
24 at least one third member
26 at least one bay
28 plurality of rods
30 plurality of clips
32 vertical portion of each bay of at least one bay 26 for supporting barrel 14 of associated pistol 12 or associated similarly configured item 34 horizontal portion of each bay of at least one bay 26 for supporting heel 18 of grip 16 of associated pistol 12 or associated similarly configured item

C. Specific Configuration 36 pair of partitions of each pair of first members of at least one pair of first members 20

38 vertical portion of each partition of pair of partitions 36 of each first member of at least one pair of first members 20

40 horizontal portion of each partition of pair of partitions 36 of each first member of at least one pair of first members 20 for separating associated pistol 12 or associated similarly configured item from each other 42 vertical portion of each second member of at least one pair of second members 22 for straddling barrel 14 of associated pistol 12 or associated similarly configured item 44 horizontal portion of each second member of at least one pair of second members 22 for supporting heel 18 of grip 16 of associated pistol 12 or associated similarly configured item 46 stop of horizontal portion of each second member of at least one pair of second members 22 for preventing heel 18 of grip 16 of associated pistol 12 or associated similarly configured item from moving back off horizontal portion 44 of associated pair of second members of at least one pair of second members 22

48 vertical portion of each third member of at least one third member 24 for supporting barrel 14 of associated pistol 12 or associated similarly configured item 50 horizontal portion of each third member of at least one third member 24 for supporting heel 18 of grip 16 of associated pistol 12 or associated similarly configured item 52 stop of horizontal portion 50 of each third member of at least one third member 24 for preventing heel 18 of grip 16 of associated pistol 12 or associated similarly configured item from moving back off horizontal portion 50 of associated third member of at least one third member 24

54 relief in vertical portion 32 of each bay of at least one 26 for receiving barrel 14 of associated pistol 12 or associated similarly configured item

5. DETAILED DESCRIPTION OF THE PREFERRED EMBODIMENTS

A. General

Referring now to the figures, in which like numerals indicate like parts, and particularly to FIG. 1, which is a diagrammatic perspective view of the expandable modular rack of the present invention storing at least one pistol of any width and/or at least one similarly configured item in its/their normal upright position, the expandable modular rack of the present invention is shown generally at 10 for storing at least one pistol 12 of any width and/or at least one similarly configured item in its/their normal upright position. Each of the at least one pistol 12 and the at least one similarly configured item has a finish, a barrel 14, and a grip 16 with a heel 18.

B. Overall Configuration

The overall configuration of the expandable modular rack 10 can best be seen in FIG. 2, which is a diagrammatic perspective view of the expandable modular rack of the present invention identified by ARROW 2 in FIG. 1, and as such, will be discussed with reference thereto.

The expandable modular rack 10 comprises at least one pair of first members 20, at least one pair of second members 22, and at least one third member 24. The at least one pair of first members 20, the at least one pair of second members 22, and the at least one third member 24 are interchangeably attached to each other, side-by-side, so as to form at least one bay 26.

The expandable modular rack 10 further comprises a plurality of rods 28 and a plurality of clips 30. The plurality of rods 28 extend through the at least one bay 26 and originate and terminate in the plurality of clips 30, respectively, so as hold the at least one pair of first members 20, the at least one pair of second members 22, and the at least one third member 24 interchangeably attached to each other, side-by-side.

It is to be understood that each rod 28 can be threadably telescopic to be length adjustable to adjust for any number of the at least one pair of first members 20, the at least one pair of second members 22, the at least one third member 24, and the at least one bay 26, or can be one piece thereby requiring interchanging thereof to adjust for any number of the at least one pair of first members 20, the at least one pair of second members 22, the at least one third member 24, and the at least one bay 26.

Each bay 26 is defined by a vertical portion 32 and a horizontal portion 34. The vertical portion 32 of each bay 26 is for supporting the barrel 14 of an associated pistol 12 or an associated similarly configured item, the horizontal portion 34 of each bay 26 is for supporting the heel 18 of the grip 16 of the associated pistol 12 or the associated similarly configured item, and each bay 26 is of varying width, thereby allowing each bay 26 to store the associated pistol 12 of any width or the associated similarly configured item in its normal upright position.

Each of the at least one pair of first members 20, the at least one pair of second members 22, and the at least one third member 24 are made of a closed cell polymer, such as ethyl vinyl acetate, for preventing easy absorption of oil or grease from the pistol 12 and for preventing harming of the finish of the pistol 12.

C. Specific Configuration

The specific configuration of the expandable modular rack 10 can best be seen in FIG. 3, which is an exploded diagrammatic perspective view of the area generally enclosed by the dotted curve identified by ARROW 3 in FIG. 2 of a typical bay of the expandable modular rack of the present invention, and as such, will be discussed with reference thereto.

Each pair of first members 20 form a pair of partitions 36. Each pair of partitions 36 define an associated bay 26, with one partition 36 being common for each adjacent pair of bays 26.

Each partition 36 has a vertical portion 38 and a horizontal portion 40. The vertical portion 38 of each partition 36 forms a part of the vertical portion 32 of an associated bay 26. The horizontal portion 40 of each partition 36 partitions adjacent bays 26 from each other for separating adjacent pistols 12 and/or adjacent similarly configured items from each other.

Each of the pair of second members 22 is generally L-shaped and has a vertical portion 42 and a horizontal portion 44. The vertical portion 42 of each of the pair of second members 22 form a part of the vertical portion 32 of an associated bay 26 and are for straddling the barrel 14 of an associated pistol 12 or an associated similarly configured item. The horizontal portion 44 of each of the pair of second members 22 form a part of the horizontal portion 34 of the associated bay 26, terminate in stops 46, and are for supporting the heel 18 of the grip 16 of the associated pistol 12 or the associated similarly configured item.

The stops 46 of the horizontal portion 44 of each of the pair of second members 22 are for preventing the heel 18 of the grip 16 of an associated pistol 12 or an associated similarly configured item from moving back off the horizontal portion 44 of an associated pair of second members 22.

The at least one third member 24 is generally L-shaped, is intimately straddled by the pair of second members 22, and has a vertical portion 48 and a horizontal portion 50. The vertical portion 40 of the at least one third member 24 forms a part of the vertical portion 32 of an associated bay 26, is intimately straddled by the vertical portions 42 of an adjacent pair of second members 22, and is for supporting the barrel 14 of an associated pistol 12 or an associated similarly configured item. The horizontal portion 50 of the at least one third member 24 forms a part of the horizontal portion 34 of the associated bay 26, terminates in a stop 52, is intimately straddled by the horizontal portions 44 of an adjacent pair of second members 22, and is for supporting the heel 18 of the grip 16 of the associated pistol 12 or the associated similarly configured item.

The stop 52 of the horizontal portion 50 of the at least one third member 24 is for preventing the heel 18 of the grip 16 of an associated pistol 12 or an associated similarly configured item from moving back off the horizontal portion 50 of an associated third member 24.

The vertical portion 48 of the at least one third member 24 is lower than the vertical portions 42 of a straddling pair of second members 22 so as to form a relief 54 therebetween. The relief 54 in the vertical portion 32 of each bay 26 is for receiving the barrel 14 of an associated pistol 12 or an associated similarly configured item.

The at least one third member 24 can be more than one for a bay 26 having a pistol 12 with a wider than normal barrel 14.

D. Conclusions

It will be understood that each of the elements described above or two or more together may also find a useful application in other types of constructions differing from the types described above.

While the invention has been illustrated and described as embodied in an expandable modular rack for storing at least one pistol of any width and/or at least one similarly configured item in its/their normal upright position, however, it is not limited to the details shown, since it will be understood that various omissions, modifications, substitutions, and changes in the forms and details of the device illustrated and its operation can be made by those skilled in the art without departing in any way from the spirit of the present invention.

Without further analysis, the foregoing will so fully reveal the gist of the present invention that others can by applying current knowledge readily adapt it for various applications without omitting features that from the standpoint of prior art fairly constitute characteristics of the generic or specific aspects of the invention.

The invention claimed is:

1. A rack for storing an item in an upright position, wherein the item has a base portion and a laterally projecting portion, said rack comprising;
   a) at least one first member;
   b) at least one second member;
   c) at least one third member;
   d) a plurality of rods; and
   e) a plurality of clips;

wherein said at least one first member is arrangeable to maintain the item in the upright position;
wherein said at least one second member is arrangeable to support the laterally projecting portion of the item;
wherein said at least one third member is arrangeable to support the base portion of the item;
wherein said at least one first member, said at least one second member, and said at least one third member are attachable to each other in side-by-side relationship;
wherein said plurality of rods extend through said at least one first member, said at least one second member, and said at least one third member, and originate and terminate in said plurality of clips, respectively, so as to hold said at least one first member, said at least one second member, and said at least one third member interchangeably attached to each other, side-by-side; and
wherein each rod is threadably telescopic to be length adjustable to adjust for any number of said at least one first member, said at least one second member, and said at least one third member.

2. The rack of claim 1, wherein the item has a finish; and
wherein each of said at least one first member, said at least one second member, and said at least one third member are made of a material resistant to absorption of oil or grease and adapted to prevent harm to the finish of the item.

3. The rack of claim 1, wherein a pair of first members form a pair of partitions.

4. The rack of claim 3, wherein each partition has a vertical portion; and
wherein each partition has a horizontal portion.

5. The rack of claim 1, wherein each of said at least one second member is generally L-shaped;
wherein each of said at least one second member has a vertical portion;
wherein each of said at least one second member has a horizontal portion;
wherein said vertical portions of an adjacent pair of said second members are adapted to sandwich the laterally projecting portion of the item therebetween; and
wherein said horizontal portions of said adjacent pair of second members are adapted to support the base portion of the item.

6. The rack of claim 5, wherein said horizontal portions of said pair of second members terminate in stops, respectively; and
wherein said stops of said horizontal portions of said pair of second members are adapted to prevent the base portion of the item from moving back off said horizontal portions of said pair of second members.

7. The rack of claim 6, wherein said vertical portion of said at least one third member is lower than said vertical portions of a sandwiching pair of second members so as to form a relief therebetween; and
wherein said relief is adapted to receive the laterally projecting portion of the item.

8. The rack of claim 5, wherein each of said at least one third member is substantially L-shaped;
wherein each of said at least one third member is intimately sandwiched by said pair of second members;
wherein said at least one third member has a vertical portion;
wherein said at least one third member has a horizontal portion;
wherein said vertical portion of said at least one third member is intimately sandwiched by said vertical portions of an adjacent pair of second members;
wherein said vertical portion of said at least one third member is adapted to support the laterally projecting portion of the item;
wherein said horizontal portion of said at least one third member is intimately sandwiched by said horizontal portions of said adjacent pair of second members; and
wherein said horizontal portion of said at least one third member is adapted to support the base portion of the item.

9. The rack of claim 8, wherein said horizontal portion of said at least one third member terminates in a stop; and
wherein said stop of said horizontal portion of said at least one third member is adapted to prevent the base portion of the item from moving back off said horizontal portion of an associated third member.

\* \* \* \* \*